(No Model.)

G. S. FOSTER.
NUT LOCK.

No. 598,920. Patented Feb. 15, 1898.

Witnesses
E. C. Wurdeman
S. Williamson

Inventor
George S. Foster
By Geo. H. Holgate
Attorney

UNITED STATES PATENT OFFICE.

GEORGE S. FOSTER, OF BUDA, ILLINOIS.

NUT-LOCK.

SPECIFICATION forming part of Letters Patent No. 598,920, dated February 15, 1898.

Application filed February 24, 1897. Serial No. 624,845. (No model.)

*To all whom it may concern:*

Be it known that I, GEORGE S. FOSTER, a citizen of the United States, residing at Buda, in the county of Bureau and State of Illinois, have invented a certain new and useful Improvement in Nut-Locks, of which the following is a specification.

My invention relates to a new and useful improvement in nut-locks, and has for its object to provide a simple, cheap, and effective device for securing a nut in place against retrograde movement independent of the surface or washer against which it may bear and which may be so manipulated as to permit the backing off of the nut when occasion requires.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1:
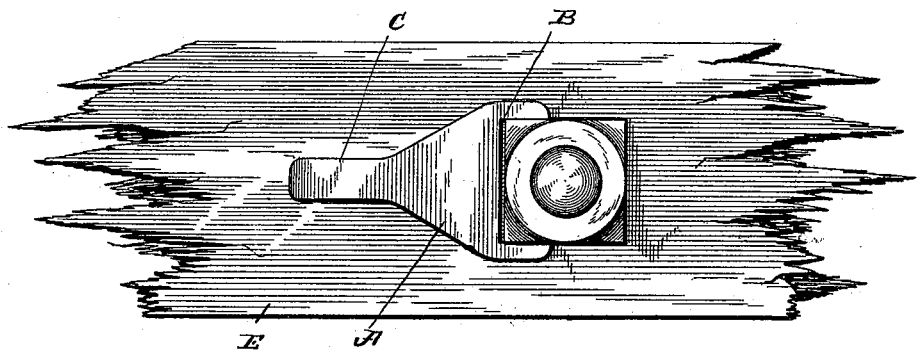
Figure 2:
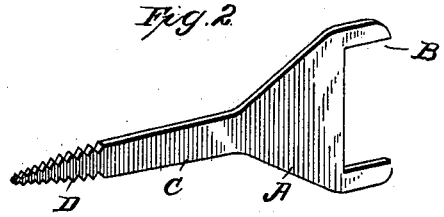

Figure 1 represents a nut held in place upon its bolt by a lock made in accordance with my improvement, and Fig. 2 is a perspective of such a lock.

In carrying out my invention as here embodied I stamp from a thin piece of sheet metal the lock A, which consists of the fork B, the shank C, and the threaded end D, and when a lock thus made is to be utilized for securing a bolt in place the threaded end thereof is run into a suitable hole in the metal or wooden surface E, against which the nut bears, and the lock is bent inward, so as to lie approximately parallel with said surface, after which it may be held out of engagement with the nut by a suitable wedge, so that when the latter is run upon its bolt it will not be interfered with by the lock, but when forced from the lock may be released by the removal of the wedge, so that its forked end will spring into engagement with the nut, as clearly shown in Fig. 1, thereafter preventing any movement of said nut in either direction.

Should at any time it be desired to either further tighten the nut or back it off the bolt, this may be accomplished by again springing the lock outward by the insertion of a suitable wedge or other implement, thus freeing the nut, but after the latter has been reset the lock may be again sprung into engagement therewith.

In practice it is preferable that the lock shall be made of sheet-steel having sufficient resiliency to permit of its being sprung to and fro when in use, thus facilitating its operations and increasing its life.

It is obvious that a nut held by a lock of this description cannot work loose by vibration, and such locks are therefore very desirable for use upon railways and high-speed machinery, where the continued vibration increases the tendency of the nuts thereon to jar loose.

The cost of manufacture of locks made in accordance with my improvement is exceedingly small, since they may be stamped from strips of sheet metal by automatic machinery, thereby reducing the labor thereon to a minimum.

Having thus fully described my invention, what I claim as new and useful is—

A nut-lock consisting of a flat piece of metal stamped to produce a shank having a pointed end with serrations forming screw-threads in the edges thereof, a body at the opposite end of the shank, ears projecting outward from the body, said shank being adapted to be screwed into the surface against which the nut bears, the body portion being bent down and the ears engaging the sides of the nut, as and for the purpose described.

In testimony whereof I have hereunto affixed my signature in the presence of two subscribing witnesses.

GEORGE S. FOSTER.

Witnesses:
W. T. AKIN,
THOMAS J. HALEY.